Patented Apr. 28, 1942

2,281,079

UNITED STATES PATENT OFFICE 2,281,079

REFRIGERATING APPARATUS

James R. Rollins, Springfield, Mass., assignor to Westinghouse Electric & Manufacturing Company, East Pittsburgh, Pa., a corporation of Pennsylvania Application March 17, 1939, Serial No. 262,371

9 Claims. (Cl. 34—105)

This invention relates to apparatus and methods for manufacturing refrigerating units and more especially to methods and apparatus for dehydrating such units.

The interior of refrigerating units must be dehydrated to prevent formation of ice crystals in the capillary tubes or regulating valves, sludging and emulsification of the lubricating oil, intercrystalline embrittlement of brasses, oxidation and chemical reactions with refrigerants and other materials, and to eliminate the possibility of shorting the field coils of the actuating motor.

The dehydration process for refrigerating units has heretofore comprised placing the units in an oven and heating them to a temperature of about 250° F. for a period of approximately eight hours and removing the water vapor present and formed in the units during this process. Placing the units in an oven, however, has heretofore required additional handling of the units and breaks up the continuity of the manufacturing processes which are carried out on moving conveyors.

It is, therefore, an object of the invention to effect dehydration of the units while moving on the conveyors.

Another object of the invention is to materially reduce the cost of manufacturing refrigerating apparatus, particularly on a large scale production.

Still another object of the invention is to dry the refrigerating units by passing a drying agent therethrough while the units are moving on a conveyor.

A further object is to provide a secondary conveyor for cylinders containing a dehydrating agent, which conveyor is synchronized with the conveyor which carries the units through the dehydrating oven, the latter conveyor preferably being the conveyor utilized for the main assembly of the refrigerating apparatus.

These and other objects are effected by my invention as will be apparent from the following description and claims taken in connection with the accompanying drawings, forming a part of this application, in which:

Figure 1:
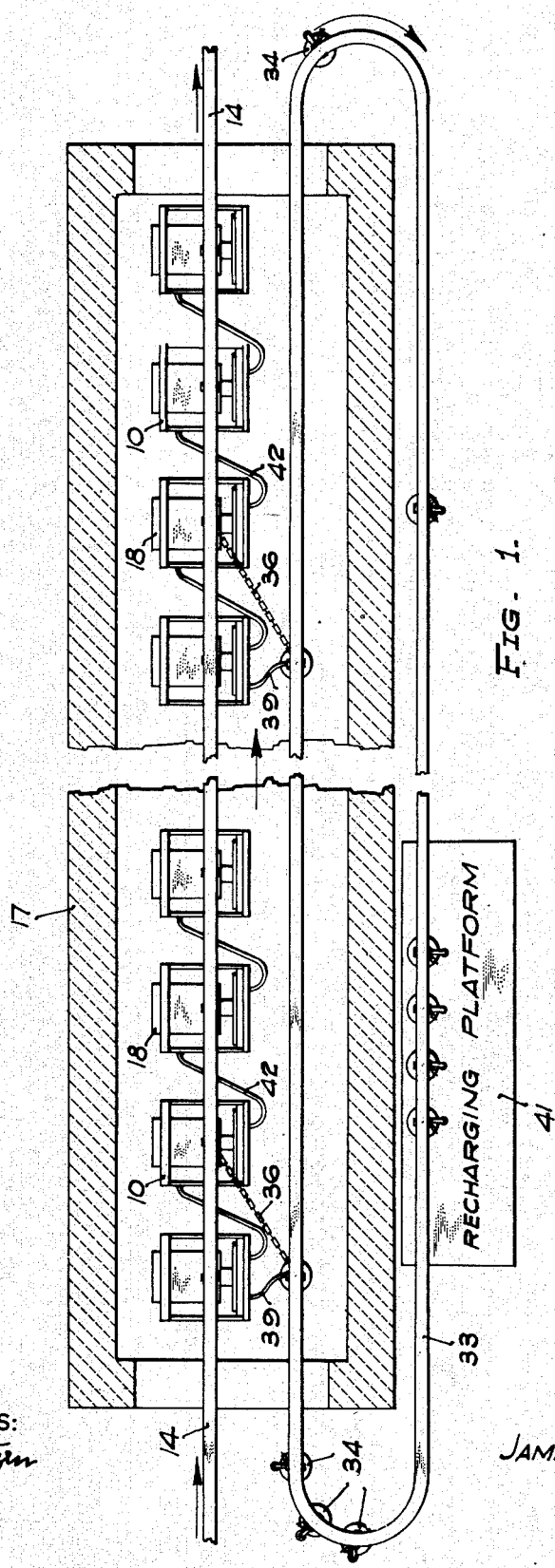
Fig. 1 is a plan view of the dehydrating oven with the top removed and illustrates the main production conveyor passing through the oven and the auxiliary conveyor which carries the dehydrating cylinders.
Figure 2:
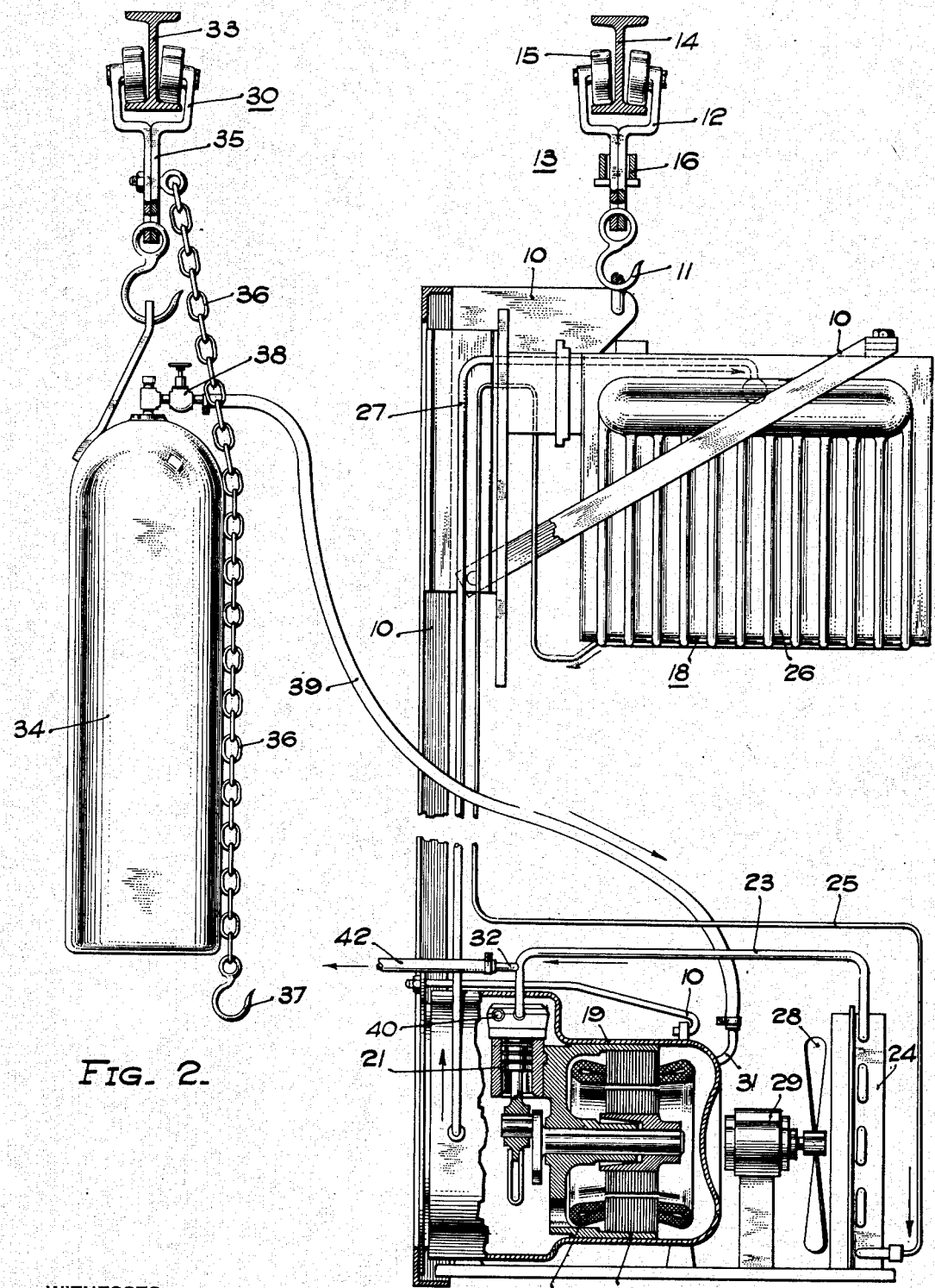
Fig. 2 is a detail view showing the refrigerating unit and the dehydrating cylinder connected thereto, substantially in the positions in which they are carried through the oven by the conveyors.

Referring specifically to the drawings for a detailed description of the invention, the reference numeral 10 designates a frame which is supported on a hook 11 of a trolley 12 of a moving conveyor 13, which trolley engages the lower flanges of an I-beam track 14 by means of two rollers 15. The rollers 15 are moved along the I-beam tracks 14 by a motivated chain 16. The frames 10 each support a refrigerating unit 18, for example, of the compression type used in domestic refrigerators. This conveyor system 13 is shown in detail in the application of Charles E. Roberts, Serial No. 176,895, filed November 27, 1937 and assigned to the assignee of the present invention. The I-beam track 14 passes through an oven 17 to convey the refrigerating units 18 therethrough.

The refrigerating unit shown comprises a sealed casing 19 containing a compressor 21 and a motor 22 for driving the same. The motor 22 includes field windings 20 which are usually covered with a cotton insulating material (not shown). A conduit 23 connects the compressor with a condenser 24, and a second conduit 25 of small internal diameter, sometimes referred to as a capillary tube, connects the condenser 24 with an evaporator 26. A third conduit 27 connects the evaporator 26 with the interior of the casing 19. An intake opening 40 of the compressor 21 also communicates with the interior of the casing 19. The path of the refrigerant in the unit 18, when completed and in operation, will be from the compressor 21, through the conduit 23 to the condenser 24, through the conduit 25 to the evaporator 26, through the conduit 27 to the sealed casing 19 from which it enters the compressor 21 through the intake opening 40 to complete the circuit. A fan 28, driven by a motor 29, draws air through the condenser 24 and blows it over the casing 19 to cool both the condenser and the casing. An inlet tube 31 is secured to the casing 19 near the motor containing end thereof and an outlet tube 32 is connected to the conduit 23 near the compressor 21 for a purpose hereinafter described.

A secondary conveyor 30, comprising an I-beam track 33, passes through the oven 17 adjacent the conveyor 13 and carries cylinders 34 preferably containing a compressed and dehydrated gas such as air, by means of trolleys 35 similar to trolleys 12. A chain 36 provided with a hook 37 is secured to each trolley 35 which hook is fastened to one of the trolleys 12 on the conveyor 13 to move the trolley 35 carrying the cylinder 34 through the oven 17. The cylinder 34 is provided with a valve 38 and a flexible tube 39. The I-beam track 33 is continued outside of the oven 17 to form a loop which conveys the cylinders 34 from the oven 17 to a recharging platform 41 and thereafter returns the cylinders 34 to the entrance end of the oven 17.

The operation of the dehydrating apparatus is as follows: A group (eight has been found to be a desirable number) of refrigerating units 18 moving along the main conveyor 13 are connected preferably in series by flexible tubes 42 to connect the inlet tube 31 of one unit to the outlet tube 32 of the following unit and the flexible tube 39 of the cylinder is connected to the inlet tube 31 of the last unit. The chain 36 connected to the trolley 35 which carries the cylinder 34 is connected to the trolley 12 carrying one of the units 18 in the group so that the chain 36 pulls the trolley 35 supporting the cylinder 34 along the I-beam track 33 and adjacent the last unit of the group. As the group enters the oven 17, the valve 38 on the cylinder 34 is opened to permit the dehydrated and compressed gas to flow consecutively through all of the units 18 in the group and out through the outlet tube 32 of the first unit in the group. When the dehydrating agent, preferably in the gaseous state, is forced into the inlet tube 31, it flows through the interior of the casing 19 and then divides, a portion entering the port 40, flows through a short length of the conduit 23 and then flows out through the conduit 32. Another portion of the gas enters the conduit 27, passes through the evaporator 26, then through the capillary tube 25, the condenser 24, the remaining portion of the tube 23, and flows out through the tube 32.

As the group emerges from the oven 17, the tubes 42 connecting the various refrigerating units 18 are removed, and the flexible tube 39 of the cylinder 34 and the chain 36 are disconnected. The individual inlet and outlet tubes 31 and 32 of the individual units 18 are pinched off and the units 18 continue on their way. In the system illustrated, the empty cylinders 34 are propelled manually along the I-beam track 33 to the recharging platform 41 where they are refilled and are then conveyed along the I-beam track 34 to the entrance of the oven 17. The oven 17 is of sufficient size and the units 18 travel at such a speed that the units are in the oven 17 for about eight hours. The actual path of the conveyors 13 and 30 in the oven 17 may be convoluted to decrease the overall length of the oven.

The cotton comprising the insulation of the motor winding is the material most difficult to dehydrate, and the dehydrating process is therefore directed principally towards the dehydration of this material.

It will be observed that this invention provides a means whereby refrigerating units traveling on the main production conveyor may be dehydrated while in motion. It further provides an apparatus which reduces the labor costs of the dehydration process and tends towards uniformity in the degree of dehydration of the unit.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In apparatus for dehydrating refrigerating units having chambers containing conductors of electricity insulated with vegetable fibers, said apparatus comprising vessels containing a dehydrating agent, means for conducting said dehydrating agent through said chambers, means for heating said conductors of electricity, and means for conveying said units and said vessels in heat-exchange relation with said heating means while said dehydrating agent passes through said chambers.

2. In apparatus for dehydrating refrigerating units, the combination of means for transporting refrigerating units and containers of a drying agent in spaced relationship, stationary means for heating said units while in motion, and conduit means connected to said containers and adapted to connect with said refrigerating units to conduct the drying agent through the heated units while the latter are in motion to remove the water vapor therein.

3. In apparatus for dehydrating refrigerating units, the combination of a stationary oven, means for transporting refrigerating units and containers of a dehydrating agent through the oven and means for conveying the dehydrating agent from said containers to said units while both are in motion, whereby said units are dehydrated in said oven while moving therethrough.

4. In apparatus for dehydrating refrigerating units while in motion, the combination of an oven, means for transporting refrigerating units and containers of compressed dehydrated gas through said oven in spaced relationship, and conduit means connected to said containers and adapted to connect with said refrigerating units to conduct the gas of said containers through the units to remove the water vapor therein.

5. In apparatus for dehydrating refrigerating units while in motion, the combination of an oven, a conveyor for transporting refrigerating units through said oven, containers of dehydrating agent, means synchronized with said conveyor for transporting said containers adjacent said conveyor through said oven, and conduit means connected to said containers and adapted to connect with said refrigerating units on said conveyor to conduct the dehydrating agent through the units to remove the water vapor therein.

6. In apparatus for dehydrating refrigerating units while in motion, the combination of an oven, a conveyor for transporting refrigerating units through said oven, containers of dehydrated gas, means synchronized with said conveyor for transporting said containers adjacent said conveyor through said oven, and conduit means connected to said containers and adapted to connect with said refrigerating units on said conveyor to conduct the gas of said containers through the units to remove the water vapor therein.

7. In apparatus for dehydrating refrigerating units while in motion, the combination of an oven, a conveyor for transporting refrigerating units through said oven at a constant speed, containers of compressed, dehydrated gas, means for transporting said containers adjacent said conveyor through said oven, and conduit means on said containers and adapted to connect with said refrigerating units on said conveyor to conduct the gas contained in the containers through the units to remove the water vapor therein.

8. In apparatus for dehydrating refrigerating units while in motion, the combination of an oven, a traveling conveyor for transporting said units through said oven, a second conveyor adjacent and parallel to said first-named conveyor for transporting containers of compressed, dehydrated gas in spaced relationship with one of said units, and means for conducting the dehydrated gas from one of said containers through at least one of said units while the latter are in the oven, said second conveyor transporting said containers from the oven to a recharging station and thereafter to the entrance of said oven.

9. In apparatus for dehydrating refrigerating units, the combination of heating means, means for progressively moving refrigerating units, each including a plurality of chambers adapted to contain refrigerant, relative to and in heat exchange relation with said heating means, and means for passing a dehydrating agent through said chambers while said units are moving relative to said heating means.

JAMES R. ROLLINS.